No. 767,146. PATENTED AUG. 9, 1904.
J. R. HAGSTROM.
FLY TRAP.
APPLICATION FILED JULY 1, 1902.
NO MODEL.
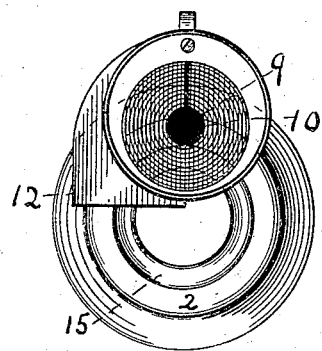
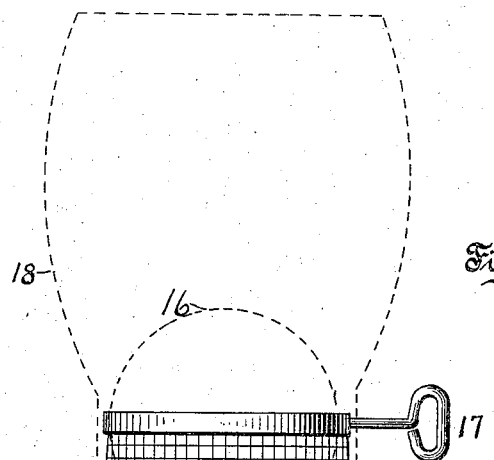
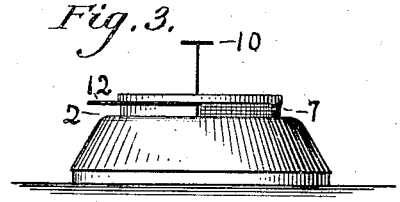
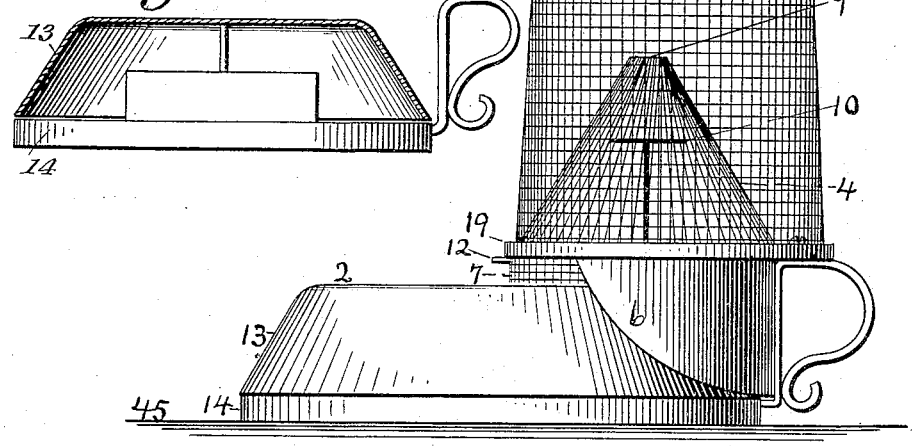
Witnesses:
Max B. A. Doring.
Ethel L. Lawler
Inventor:
John R. Hagstrom
By
Townsend & Decker
Attorneys No. 767,146. Patented August 9, 1904.

UNITED STATES PATENT OFFICE.

JOHN R. HAGSTROM, OF BROOKLYN, NEW YORK.

FLY-TRAP.

SPECIFICATION forming part of Letters Patent No. 767,146, dated August 9, 1904.

Application filed July 1, 1902. Serial No. 113,922. (No model.)

*To all whom it may concern:*

Be it known that I, JOHN R. HAGSTROM, a citizen of the United States, and a resident of Brooklyn, in the county of Kings and State of New York, have invented certain new and useful Improvements in Fly-Traps, of which the following is a specification.

My invention relates to improvements in the construction of insect-traps, and especially to traps designed to catch flies.

The invention relates more particularly to that class of traps in which a revolving plate or platform carries insects beneath a receptacle, where they are detained and caused to pass to a proper pound.

My invention consists, first, in a fly-trap of the general construction above described having a plate or platform disposed or arranged to revolve in a horizontal plane and provided with a depending skirt or flange, as hereinafter described.

My invention consists, further, in an improved guard to prevent the escape of flies from the pound through an opening by which they pass thereto and in means for preventing them from retracing their path in a direction opposite to that in which the moving platform moves to carry them beneath the pound or receptacle, also in other features of construction.

In the accompanying drawings, Figure 1 is a side elevation of the apparatus. Fig. 2 is a plan of the same with the pound removed. Fig. 3 is an elevation of the lower part, on a reduced scale, taken at right angles to Fig. 1. Fig. 4 is a side elevation of a portion of the apparatus, the revolving platform being shown in section and the base and casing for the motor in side elevation.

Referring to the drawings, 2 indicates the plate or platform, which is supported upon a suitable shaft, as well understood in the art, and is arranged to revolve in a horizontal plane. This plate is generally furnished with a suitable bait or lure, which may be placed in the groove 15 or on other parts. This plate may be revolved by a clockwork or mechanism of any desired character adapted to produce a slow rotation of the plate, as well understood in the art, and to carry the flies or insects around beneath the cage or receptacle 4, into which they are forced to pass, their further movement on the plate being prevented by the sheet-metal flange or wall 6, combined with the fence 7, which depends from the support of pound 8 down into close proximity to the upper surface of the plate 2, as clearly shown in the drawings. The cone 4, of woven wire or other suitable material, has the opening or gate 9 at its top from which the flies or insects pass to the pound 8, detachably supported upon the ring or plate 19. Beneath the opening 9 is a guard 10, consisting of a disk or plate of any suitable material, supported beneath the opening 9 and blackened or darkened upon its upper surface to operate as a guard by offering the appearance of a hole or opening which will deter the flies or insects from passing backward down through the gate 9 after they have entered the pound 8 and will also serve to direct or force them upward from the cone into the pound as soon as they have flown above the level of the guard-plate 10.

To prevent the flies or insects from passing backward from beneath the cone 4 in the direction opposite to that in which they are carried by the revolving plate or disk, I provide a shade 12, consisting of a flange or projection of any suitable character projecting from the plate or support 19 over the opening by which the flies or insects are carried beneath the cone 4 and adapted to cast a shadow upon the surface of the platform which will operate in a similar manner to the guard 10 to deter the flies or insects from escaping.

The platform 2 is provided with a depending flange 13, which extends down, preferably, to or near to the surface of the table or object upon which the trap is placed. This flange or skirt is preferably arranged with an incline or made flaring, as shown, but might depend vertically. It operates in practice to invite the fly or insect to light upon the moving structure, and in practice I find that it is a very effectual addition to the ordinary horizontally-disposed revolving plate or platform.

The base 14 may be secured to the stationary part of the structure and arranged with its upper edge in close proximity to the lower edge of the flange or skirt 13, so that the insects may crawl easily from the surface of the table or support 45 to the platform.

At the top of the pound 8 is provided an exit-gate 16, which is normally closed. This gate is preferably hung upon centrally-disposed pivots or gimbals and provided with an outwardly-extending handle 17, whereby it may be opened after a suitable sack of cheesecloth or mosquito-netting 18 has been applied over the top of the pound 8, with its opening encircling the top or gate of the latter. After placing the sack over the gate the handle 6 will serve to open said gate, and after the flies or insects have passed into the sack the gate may be closed again and the flies thus secured within the sack for removal and destruction.

What I claim as my invention is—

1. In a fly or insect trap, the combination substantially as described, of a revolving plate or platform, a receptacle having a gate or opening from which the flies or insects pass to a pound and a guard disk or plate beneath said opening darkened on its surface opposite the gate or opening, as and for the purpose described.

2. In a fly-trap, the combination substantially as described of a revolving plate or platform, a receptacle covering the same in part, and a plate or shade extending over the platform at the mouth of the receptacle to cast a shadow upon the surface of said revolving plate.

3. In a fly or insect trap, a revolving plate or platform having a depending skirt or flange extending down into suitable proximity to the base to permit the fly or insect to crawl onto said skirt or flange.

4. In a fly or insect trap, the combination with the revolving plate or platform, of a depending flaring skirt or flange.

Signed at New York, in the county of New York and State of New York, this 28th day of June, A. D. 1902.

JOHN R. HAGSTROM.

Witnesses:
J. GALLWITZ,
E. L. LAWLER.